Figure 1:
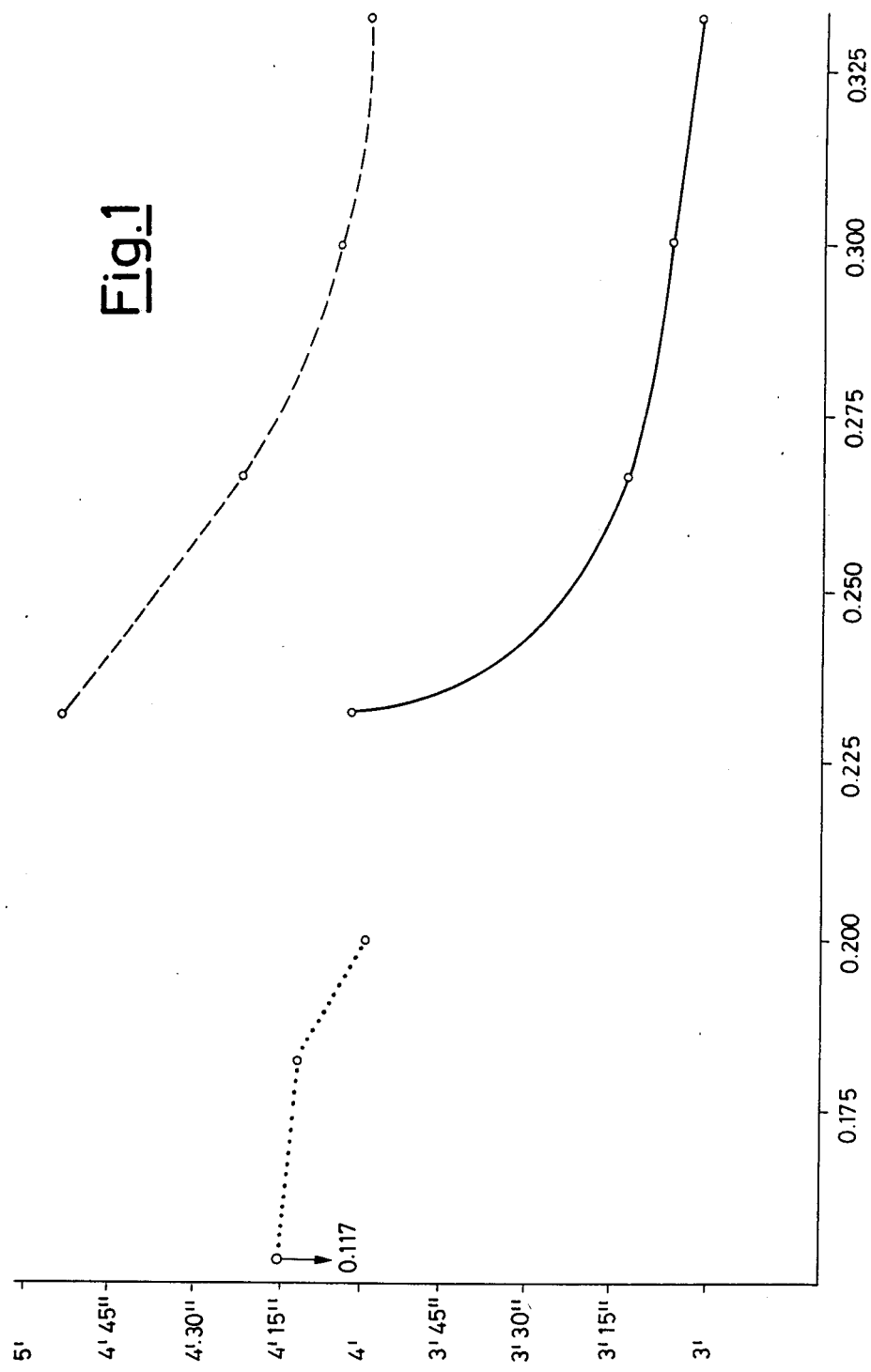

United States Patent [19]

Caporossi et al.

[11] Patent Number: 4,695,616
[45] Date of Patent: Sep. 22, 1987

[54] PROCESS FOR POLYMERIZATION OF VINYL CHLORIDE IN SUSPENSION

[75] Inventors: Adolfo Caporossi, Ravenna; Leonello Del Signore, L'Aquila, both of Italy

[73] Assignee: Anic, S.p.A., Palermo, Italy

[21] Appl. No.: 701,433

[22] Filed: Feb. 11, 1985

Related U.S. Application Data

[63] Continuation of Ser. No. 448,265, Dec. 9, 1982, abandoned.

[30] Foreign Application Priority Data

Dec. 11, 1981 [IT] Italy .............................. 25518 A/81

[51] Int. Cl.[4] .............................................. C08F 2/20
[52] U.S. Cl. .................................. 526/202; 526/344.2
[58] Field of Search ........................................ 526/202

[56] References Cited

U.S. PATENT DOCUMENTS

| | | | |
|---|---|---|---|
| 3,817,959 | 6/1974 | Balwé | 526/202 |
| 4,152,500 | 5/1979 | Foschi | 526/74 |
| 4,258,163 | 3/1981 | Mariasi | 526/202 |

FOREIGN PATENT DOCUMENTS 1524492 9/1978 United Kingdom ................. 526/74

*Primary Examiner*—Christopher Henderson
*Attorney, Agent, or Firm*—Hedman, Gibson, Costigan & Hoare

[57] ABSTRACT

An improved process for the polymerization and copolymerization of vinyl chloride in suspension, characterized by using, together with the normal polymerization agents, a single suspending agent consisting of partially saponified polyvinyl acetate of medium degree of hydrolysis, prepared by the controlled alkaline alcoholysis of polyvinyl acetate in the presence of methyl acetate.

3 Claims, 4 Drawing Figures

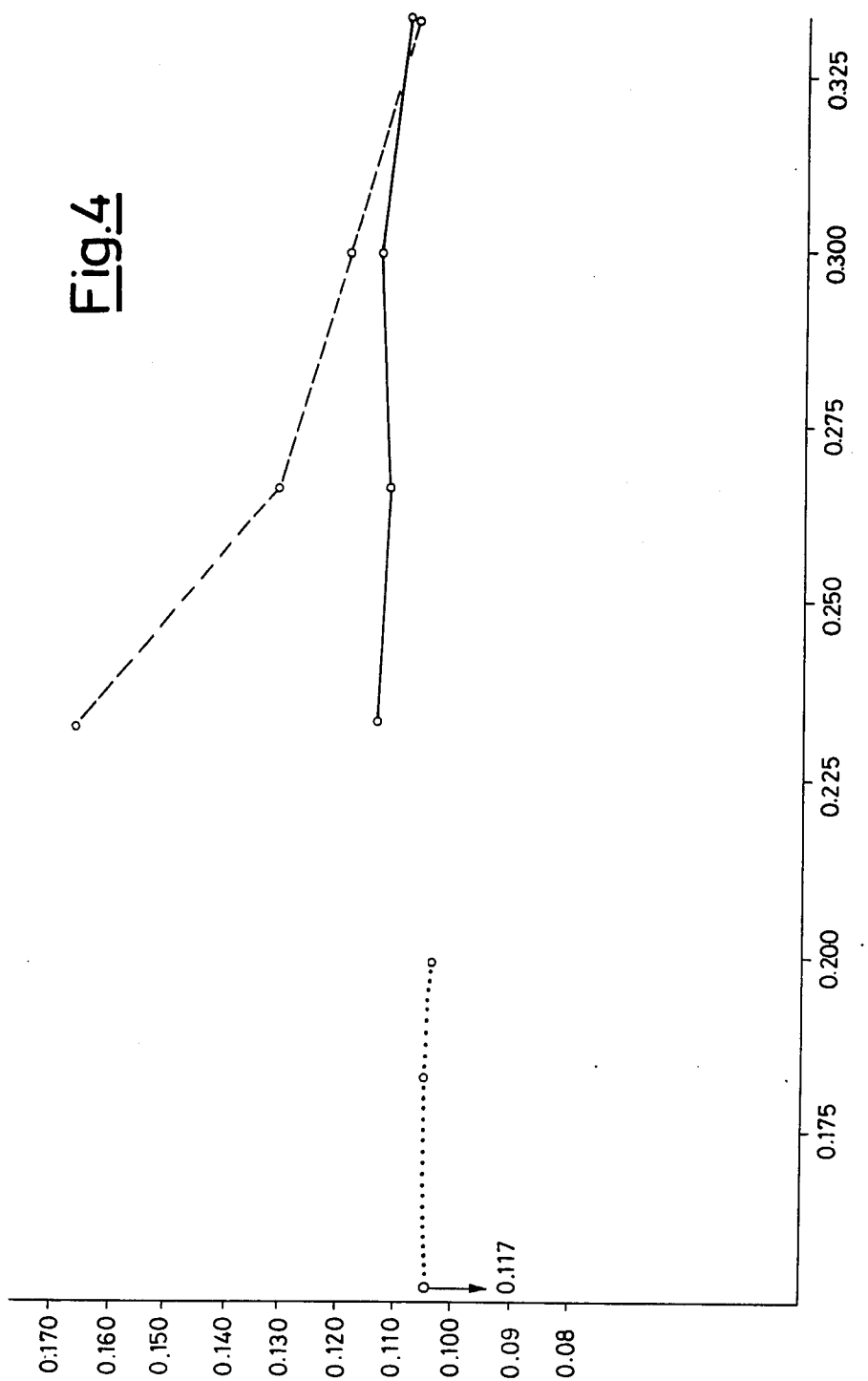

PROCESS FOR POLYMERIZATION OF VINYL CHLORIDE IN SUSPENSION

This application is a continuation of Ser. No. 448,265, filed Dec. 9, 1982 which is now abandoned.

This invention relates to an improved process for the polymerisation and copolymerisation of vinyl chloride in suspension, consisting of polymerising the vinyl chloride and other possible comonomers in accordance with known methods, i.e. in water in the presence of suitable quantities of a peroxide initiator and possible buffer agents, but using as the sole suspending agent a partially saponified polyvinyl acetate of medium degree of hydrolysis, conveniently with a saponification number of between 440 and 280, prepared by controlled alkaline alcoholysis (also known hereinafter as polyvinyl alcohol of medium degree of hydrolysis).

The polymerisation or copolymerisation of vinyl chloride in suspension is normally carried out in an aqueous medium in the presence of a peroxide catalyst, possible buffer agents and one or more suspending agents, possibly combined with an ionogenic or non-ionogenic wetting agent (where this characteristic is not already inherent in the initiator).

The suspending agents normally used comprise water-soluble modified cellulose such as methyl cellulose or methylhydroxypropyl cellulose, vinyl acetate-maleic anhydride copolymers, polyvinyl alcohols of high degree of hydrolysis, etc. However, in this manner polymers are obtained of low porosity, which therefore possess low and non-uniform absorption of plasticiser and difficult workability.

Moreover, it is very difficult to remove the monomer present in a low porosity polymer, even by stripping, and such a polymer is therefore unsuitable for satisfying the present worker protection requirements in the PVC industry.

In order to improve the porosity of the prepared polyvinyl chloride particles, it is convenient to add small quantities of a secondary suspending agent, generally a polyvinyl alcohol of lower degree of hydrolysis, but substantial improvements have not been obtained (U.K. Pat. No. 1524 492) and in fact a very small increase in the porosity nearly always results in a reduction in the apparent density, a characteristic which is undesirable for the further working of the polymer, in that it leads to a reduction in the productivity rate of the machinery used.

It has now been discovered that by using during the polymerisation stage a single suspending agent consisting of a polyvinyl alcohol of medium degree of hydrolysis prepared by the controlled alkaline alcoholysis of polyvinyl acetate as described in copending application, Ser. No. 353,260 now U.S. Pat. No. 4,456,731 and having a very regular distribution of the hydroxyls in the polymer chain, even in a very small quantity, it is possible to prepare a polymer possessing excellent characteristics (high apparent density, very low number of inclusions or fish eyes etc.) in addition to high porosity. The quantity of vinyl chloride monomer present in the polymer prepared by this process is reduced after stripping in a stripper (corresponding to stripping in a flask in the laboratory) to values which lie within the limits of error of the analysis instruments, and in fact below 1 ppm.

Further advantages of the polymers prepared by the process of the present invention are their high uniformity of porosity distribution within the polymer particles, this giving them a particular morphology, their high uniformity of particle size, and their narrow dimensional distribution of the polymer particles.

Various examples of the polymerisation of vinyl chloride and its copolymerisation with vinyl acetate carried out in accordance with the present invention are described hereinafter for non-limiting illustrative purposes in comparison with tests carried out in accordance with conventional procedures, the results obtained being given in Tables 1 and 2.

In addition to the attainment of the aforesaid objects (increase in porosity without reduction in the apparent density, thus maintaining or increasing the production rate of the transformation machinery), other advantages are attained as is evident from an examination of the summary table, namely:

high productivity (for high conversion)
improvement in the PVC quality by virtue of high particle size uniformity, narrow dimensional distribution of the polymer particles, absence of powder material
absence of vitrified material
lesser soiling of the polymerisation reactors
lower foam formation
simplicity of formulation (reduction in the polymerisation ingredients), with consequent stock reduction
formulation flexibility, with the ability to obtain a wide range of products with defined and controlled characteristics
almost total elimination of the residual vinyl chloride monomer after stripping.

EXAMPLE 1

For this example, vinyl chloride was polymerised by normal procedures in the presence of various suspending agents. The following ingredients were fed into a 25 m$^3$ reactor fitted with an agitator (Pfaudler):

| | |
|---|---|
| vinyl chloride monomer | 100 parts |
| water | 150 parts |
| methylhydroxypropyl cellulose | 0.117 parts |
| polyvinyl alcohol of saponification number 140 (primary suspending agent) | 0.042 parts |
| polyvinyl alcohol of saponification number 460 (secondary suspending agent) | 0.1 parts |
| NaHCO$_3$ | 0.02 parts |
| tert-butylcyclohexyl peroxydicarbonate | 0.05 parts |
| lauroyl peroxide | 0.017 parts |

All parts are by weight.

The secondary suspending agent, namely polyvinyl alcohol of medium degree of hydrolysis, is a product obtained by the acid hydrolysis of polyvinyl acetate.

The polymerisation is carried out under agitation at 120 rpm at a temperature of 53.5° C.

The reaction proceeds until a pressure reduction of 3.5 kg/cm$^2$ is attained, this corresponding to a conversion of 86%.

The residual monomer was removed by stripping under vacuum around 70°-80° C., to give a VCM residue in the polymer of 470 ppm.

The polyvinyl chloride obtained has a K value around 70.1.

All other characteristics of the polymer are given in Table 1.

EXAMPLE 2

Polymerisation was carried out in accordance with the preceding example, using as suspending agent polyvinyl alcohol prepared by the controlled alkaline alcoholysis of a conventional polyvinyl acetate having a saponification number of 390. The suspending agents were used in the following quantities, the other ingredients being used in the quantities of the preceding example:

| | |
|---|---|
| methylhydroxypropyl cellulose | 0.09 parts |
| polyvinyl alcohol of saponification number 140 | 0.058 parts |
| polyvinyl alcohol of saponification number 390 | 0.1 parts |

The polymer obtained had a K value of 70.8, a slightly increased porosity, a constant apparent density, and a residual VCM content which was halved, as shown in the summary table 1.

EXAMPLES 3 TO 15

Successive polymerisation tests were carried out using a single suspending agent, namely a polyvinyl alcohol obtained by the controlled alkaline alcoholysis of polyvinyl acetate, of K value 31, with different degrees of alcoholysis (ex. 3 to 7), and a polyvinyl alcohol prepared by the controlled alkaline alcoholysis of polyvinyl acetate of wide molecular weight distribution (ex. 8 to 15).

The quantities of suspending agent used in each case and the results obtained are summarised in table 1.

It can be seen from the results of examples 3 to 7 that an increase in the quantity of suspending agent used leads to a porosity increase, whereas it does not appreciably influence the particle size (in terms of average dimensions), however it does cause it to concentrate around more uniform values. In contrast, it leads to a reduction in the apparent density.

The best results in terms of porosity, apparent density and particle size distribution, are those obtained with medium quantities of polyvinyl alcohol having a saponification number of around 330 and 412 prepared from polyvinyl acetate of wide molecular weight distribution (ex. 8 to 11).

EXAMPLES 16 AND 17

Tests on the polymerisation of vinyl chloride with vinyl acetate were carried out in the reactor of example 1, in the first case using a conventional system, i.e. two suspending agents, and in the second case using a single suspending agent in the form of polyvinyl alcohol having a saponification number of 330 produced by the controlled alkaline alcoholysis of polyvinyl acetate of wide molecular weight distribution (as used in examples 8 to 11).

The polymerisation was carried out at 60° C.

The formulations used and the results obtained are shown in Table 2.

The copolymers produced in these examples are used for the manufacture of gramophone records, and thus the measurement of their porosity as a function of the plasticiser absorption is not reported, as this is not a significant value for this purpose.

The results obtained were evaluated in terms of particle size, this being important for transformation operations, and their residual vinyl chloride monomer content, this being particularly important for the high temperature working of the product.

In the example using a single suspending agent, this passes below the maximum limits allowed by health regulations, whereas in the other case it was largely above.

The rsults obtained in examples 1 to 15 are shown in the diagram of FIGS. 1 to 4 in terms of the most important characteristics.

These diagrams show the variation in the porosity, apparent density and particle size as a function of the type and quantity of polyvinyl alcohol used as the sole suspending agent.

Figure 2:
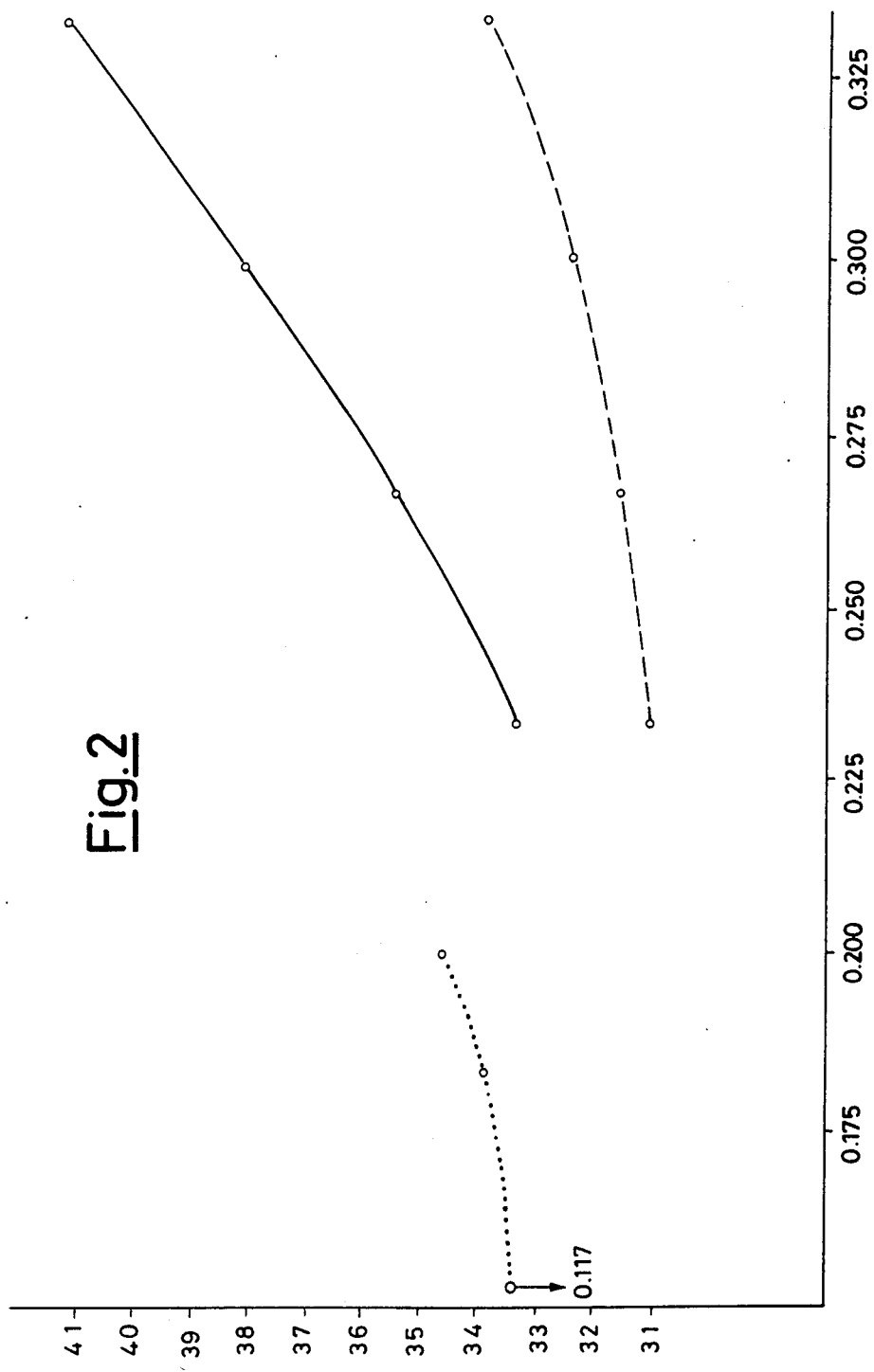
Figure 3:
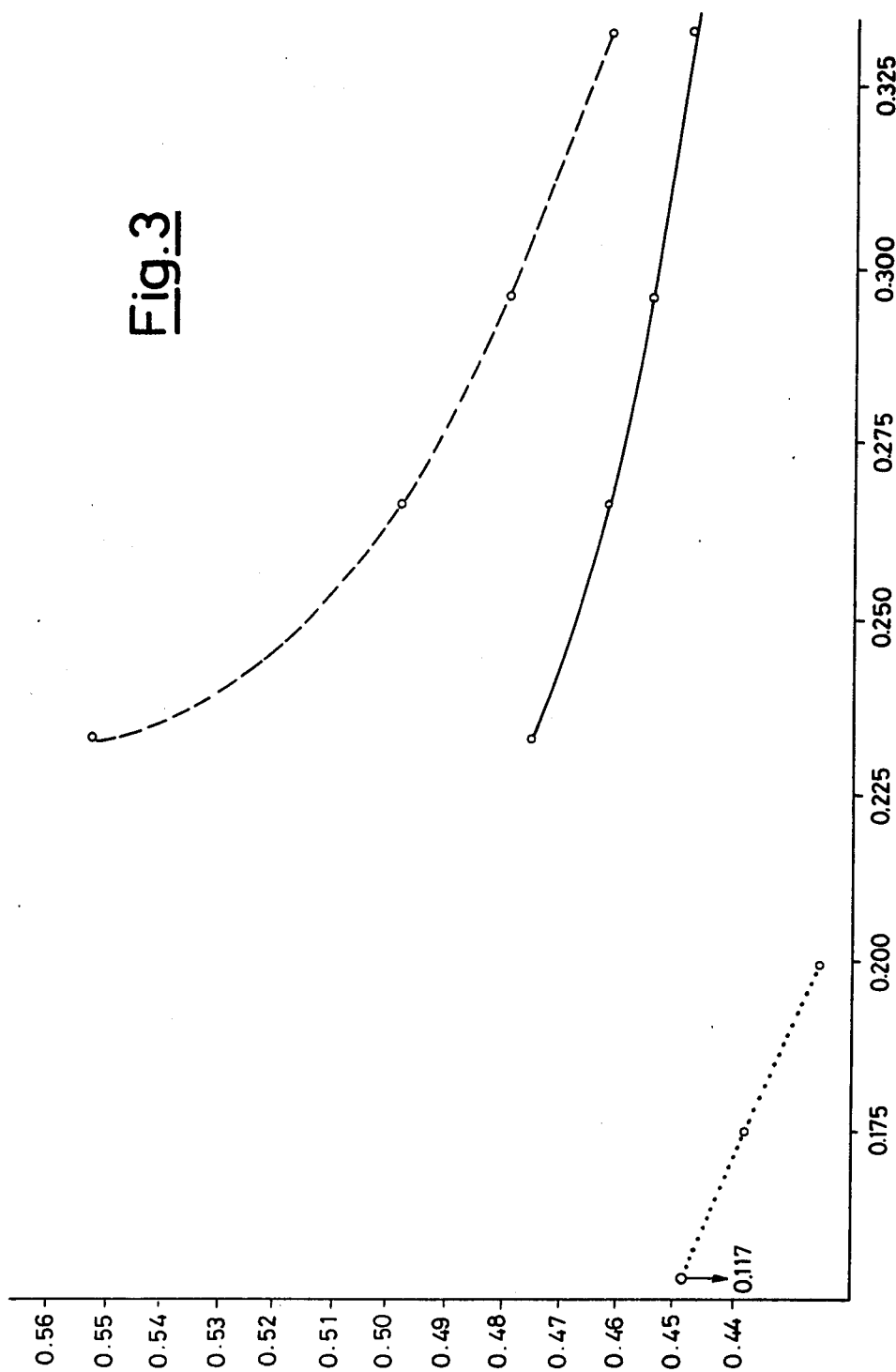

In FIG. 1, the PAR value is a measurement of the time necessary for the absorption of 50 parts of plasticiser by 100 parts of PVC. In FIG. 2, the ppf gives the percentage quantity of plasticiser absorbed at saturation point by the PVC at ambient temperature. FIG. 3 shows the apparent density, and FIG. 4 the particle size (mean diameter). In all figures, the dotted line relates to tests carried out using polyvinyl alcohol prepared by controlled alkaline alcoholysis of standard polyvinyl acetate having a saponification index of 330, whereas the dashed and full lines relate to tests carried out using polyvinyl alcohol prepared by the controlled alkaline alcoholysis of polyvinyl acetate of wide molecular weight distribution, having a saponification number of 412 and 330 respectively.

TABLE 1

| INGREDIENTS AND CHARACTERISTICS | EXAMPLES | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| VCM | 100 | 100 | 100 | 100 | 100 | 100 | 100 | 100 | 100 | 100 | 100 | 100 | 100 | 100 | 100 |
| Water | 150 | 150 | 150 | 150 | 150 | 150 | 150 | 150 | 150 | 150 | 150 | 150 | 150 | 150 | 150 |
| Methylhydroxypropyl cellulose | 0.117 | 0.090 | | | | | | | | | | | | | |
| Polyvinyl alcohol S.N.140 | 0.042 | 0.056 | | | | | | | | | | | | | |
| Polyvinyl alcohol S.N.460 (acid hydrolysis) | 0.1 | | | | | | | | | | | | | | |
| Tert-butylcyclohexyl peroxydicarbonate | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Lauroyl peroxide | 0.017 | 0.017 | 0.017 | 0.017 | 0.017 | 0.017 | 0.017 | 0.017 | 0.017 | 0.017 | 0.017 | 0.017 | 0.017 | 0.017 | 0.017 |
| NaHCO$_3$ | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| Polyvinyl alcohol | | | 0.117 | 0.183 | 0.200 | | | | | | | | | | |

TABLE 1-continued

| INGREDIENTS AND CHARACTERISTICS | EXAMPLES | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| S.N.330 Polyvinyl alcohol | | | | | | 0.15 | 0.117 | | | | | | | | |
| S.N.360 Polyvinyl alcohol | | 0.01 | | | | | | | | | | | | | |
| S.N.390 Polyvinyl alcohol wide M.W. distribution: | | | | | | | | | | | | | | | |
| S.N.330 | | | | | | | | 0.233 | 0.267 | 0.3 | 0.33 | | | | |
| S.N.412 | | | | | | | | | | | | 0.233 | 0.267 | 0.3 | 0.33 |
| K value | 80.1 | 70.8 | 70 | 70.2 | 69.8 | 70 | 69.9 | 70.6 | 70.4 | 70.4 | 70 | 69.6 | 70.1 | 70.3 | 70 |
| Apparent density | 0.461 | 0.460 | 0.448 | 0.434 | 0.426 | 0.455 | 0.453 | 0.475 | 0.463 | 0.454 | 0.448 | 0.553 | 0.499 | 0.478 | 0.463 |
| PAR (minutes) | 4m | 3m36s | 4m15s | 4m12s | 4m | 4m06s | 4m | 4m | 3m15s | 3m06s | 3m | 4m52s | 4m23s | 4m05s | 4m |
| ppf | 29.8 | 33.3 | 33.6 | 33.9 | 34.6 | 34.5 | 34.4 | 33.3 | 35.3 | 38.1 | 42.0 | 31.1 | 31.6 | 32.4 | 33.8 |
| Porosity $cm^3/g$ | 0.319 | n.d. | n.d. | n.d. | 0.386 | n.d. | 0.407 | n.d. | 0.426 | 0.438 | 0.446 | n.d. | 0.403 | n.d. | n.d. |
| Mean diameter mm. | 0.117 | 0.117 | 0.105 | 0.104 | 0.105 | 0.113 | 0.108 | 0.113 | 0.111 | 0.113 | 0.108 | 0.160 | 0.131 | 0.119 | 0.107 |
| Conversion | >86 | >88 | >90 | >90 | >90 | >90 | >90 | >90 | >90 | >90 | >90 | >90 | >90 | >90 | >90 |
| Fish eyes | 7 | 8 | 8 | 3 | 6 | 4 | 4 | 18 | 9 | 2 | 3 | >100 | 11 | 6 | 6 |
| VCM residue: | | | | | | | | | | | | | | | |
| (a) stripping in reactor ppm | 470 | 210 | 60 | 65 | 73 | 49 | 96 | 51 | 30 | 20 | 20 | 20 | 20 | 20 | 20 |
| (b) flask ppm | 26 | 12 | <2 | <2 | <2 | <5 | ~5 | 10 | <2 | <1 | <1 | <2 | <2 | <2 | <1 |
| Extruder throughput: | | | | | | | | | | | | | | | |
| 15 rpm | 5.6 | | | | | | | 8.7 | | | | 9.4 | | | |
| 30 rpm | 11.4 | | | | | | | 18.8 | | | | 19.9 | | | |
| PARTICLE SIZE DISTRIBUTION: | | | | | | | | | | | | | | | |
| 0.31 mm. | | | | | | | | | | | | 0.2 | | | |
| 0.25 mm. | 0.2 | | | | | | | | | | | 6.2 | 0.4 | 0.2 | |
| 0.20 mm. | 3 | 0.4 | 0.4 | | 0.2 | 0.4 | | | | | | 23.2 | 3.6 | 1.4 | |
| 0.16 mm. | 7.6 | 2 | 2.8 | 0.4 | 0.6 | 1.4 | 2.4 | 0.4 | | | | 24.8 | 9.6 | 4.8 | 0.4 |
| 0.10 mm. | 54.4 | 70 | 47.6 | 49.6 | 47.8 | 43.6 | 48.3 | 64.4 | 62.6 | 66.4 | 52.4 | 34.4 | 73.6 | 68.8 | 58.8 |
| 0.071 mm | 27.6 | 24 | 40 | 42.4 | 47.6 | 48.8 | 41.6 | 30.4 | 34.2 | 31.2 | 46.4 | 5.6 | 8 | 15.6 | 32.4 |
| Bottoms | 7.2 | 3.6 | 9.2 | 7.6 | 4 | 6 | 7.3 | 4.8 | 3.2 | 2.4 | 1.2 | 5.6 | 4.8 | 9.2 | 8.4 |

PAR = time necessary for absorbing 50 parts of plasticiser by 100 parts of polymer
ppf = parts of plasticiser absorbed at saturation under cold conditions by 100 parts of polymer
Porosity = cubic centimeters of mercury absorbed by 1 g of polymer under 100 kg/cm³ pressure

TABLE 2

Comparison of vinyl chloride - vinyl acetate copolymerisation using secondary suspending agent and single suspending agent.

| INGREDIENTS AND CHARACTERISTICS | EXAMPLES | |
|---|---|---|
| | 16 | 17 |
| VCM | 92 | 92 |
| Vinyl acetate | 8 | 8 |
| Water | 150 | 150 |
| Methylhydroxypropyl cellulose | 0.25 | — |
| Polyvinyl alcohol N.S. 140 (88%) | 0.25 | — |
| Polyvinyl alcohol wide M.W. distribution S.N. 330 | — | 0.31 |
| Tert-butylcyclohexyl peroxydicarbonate | 0.025 | 0.025 |
| Lauroyl peroxide | 0.017 | 0.017 |
| NaHCO₃ | 0.02 | 0.02 |
| K value | 59.5 | 60.1 |
| Apparent density | 0.530 | 0.535 |
| Conversion | >90% | >90% |
| Fish eyes | >100 | 22 |
| Residual VCM (flask) p.p.m. | 125 | <5 |
| Particle size distribution: | | |
| 0.25 mm. | 0.6 | |
| 0.20 mm. | 1.8 | |
| 0.16 mm. | 16.2 | 14.8 |
| 0.10 mm. | 36.4 | 39.6 |
| 0.071 mm. | 36.4 | 43.2 |
| Bottoms | 8.6 | 2.4 |

We claim:

1. A process for the polymerization of vinyl chloride monomer in suspension to prepare polymers of high porosity and a vinyl chloride monomer content of less than 2 ppm said process comprising polymerising the vinyl chloride in an aqueous medium in the presence of an adequate quantity of peroxide initiator with or without buffer agents and ionogenic or nonionogenic wetting agents in the presence of a single component suspending agent which consists of from 0.267 to 0.33% by weight of partially saponified polyvinyl acetate with a saponification number of between about 412 and about 330, that is prepared by controlled alkaline alcoholysis in the presence of methyl acetate and thereafter stripping the unreacted vinyl chloride monomer.

2. A process as claimed in claim 1, wherein the single suspending agent is variable in quantity from 0.1 to 0.4% by weight of the monomer used.

3. A process as claimed in claim 1, wherein the partially saponified polyvinyl acetate that is obtained by means of controlled alkaline hydrolysis in the presence of methyl acetate is used at a level of 0.1 to 0.4 by weight of the monomer used.

* * * * *